US008627315B2

(12) United States Patent
Li et al.

(10) Patent No.: US 8,627,315 B2
(45) Date of Patent: Jan. 7, 2014

(54) APPARATUS AND METHOD FOR COOPERATIVE GUEST FIRMWARE

(75) Inventors: Shaofan Li, Shanghai (CN); Gao Haoyu, Shanghai (CN); William Cheung, San Jose, CA (US); Ke Yu, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 2121 days.

(21) Appl. No.: 10/555,336

(22) PCT Filed: Dec. 31, 2004

(86) PCT No.: PCT/CN2004/001588
§ 371 (c)(1),
(2), (4) Date: Oct. 31, 2005

(87) PCT Pub. No.: WO2006/069493
PCT Pub. Date: Jul. 6, 2006

(65) Prior Publication Data
US 2007/0011486 A1    Jan. 11, 2007

(51) Int. Cl.
*G06F 9/46* (2006.01)
*G06F 13/00* (2006.01)
*G06F 15/173* (2006.01)

(52) U.S. Cl.
USPC ........... 718/100; 718/104; 719/324; 709/224; 709/226

(58) Field of Classification Search
USPC .......................................................... 718/1
See application file for complete search history.

(56) References Cited

U.S. PATENT DOCUMENTS

| | | | |
|---|---|---|---|
| 6,081,890 A * | 6/2000 | Datta ................................ 713/1 |
| 7,281,124 B2 * | 10/2007 | Rothman et al. .................. 713/1 |
| 7,302,514 B2 * | 11/2007 | Ouriel et al. ....................... 711/6 |
| 2002/0143842 A1 * | 10/2002 | Cota-Robles et al. ............ 709/1 |
| 2003/0217250 A1 * | 11/2003 | Bennett et al. ................. 712/224 |
| 2004/0268107 A1 * | 12/2004 | Zimmer et al. .................... 713/1 |
| 2004/0268347 A1 * | 12/2004 | Knauerhase et al. ............. 718/1 |
| 2005/0091365 A1 * | 4/2005 | Lowell et al. ................. 709/224 |
| 2005/0091652 A1 * | 4/2005 | Ross et al. ........................ 718/1 |

FOREIGN PATENT DOCUMENTS

WO    WO 2004/061659    7/2004

OTHER PUBLICATIONS

Goldberg, R., "Survey of Virtual Machine Research", IEEE Computer Magazine 7(6), pp. 34-45, 1974.*
International Preliminary Report on Patentability for PCT/CN2004/001588, issued Jul. 12, 2007.

* cited by examiner

*Primary Examiner* — Meng An
*Assistant Examiner* — Caroline H Arcos
(74) *Attorney, Agent, or Firm* — Blakely, Sokoloff, Taylor & Zafman LLP (57) ABSTRACT

A method and apparatus for cooperative guest firmware are described. In one embodiment, the method includes the launch of a virtual machine (VM) including a guest operating system (OS) and guest firmware. Prior to launching the VM, a data structure is generated in memory and is associated with the guest firmware to provide a virtualization policy provided by the VM as well as processor and platform configuration information to the guest firmware. In one embodiment, the guest firmware uses the data structure to access static information regarding the virtualization policy, as well as the processor and platform configuration information in response to requests from the guest OS. However, when the guest OS requires a host platform service, a virtual machine monitor (VMM) services the guest firmware requests for host platform services. Other embodiments are described and claimed.

9 Claims, 5 Drawing Sheets

APPARATUS AND METHOD FOR COOPERATIVE GUEST FIRMWARE

The present patent application is a non-provisional application of International Application No. PCT/CN2004/001588, filed Dec. 31, 2004.

FIELD

One or more embodiments relate generally to the field of computer system design. More particularly, one or more of the embodiments relate to a method and apparatus for cooperative guest firmware.

BACKGROUND

A virtual machine architecture logically partitions a physical machine, such that the underlying hardware of the machine is time-shared and appears as one or more independently operating virtual machines (VMs). A virtual machine monitor (VMM) creates the VM and runs on a computer to facilitate for other software the abstraction of one or more VMs. Each VM may function as a self-contained platform, running its own operating system (OS) and application software. The software running in a VM is collectively referred to herein as "guest software."

The guest software expects to operate as if it were running on a dedicated computer rather than in a VM. That is, the guest software expects to control various events and have access to hardware resources on the computer (e.g., physical machine). The hardware resources of the physical machine may include one or more processors, resources resident on the processors (e.g., control registers, caches and others), memory (instructions residing in memory, e.g., descriptor tables), and other resources (e.g., input/output devices) that reside in the physical machine. The events may include interrupts, exceptions, platform events (e.g., initialization) (INIT) or system management interrupts (SMIs), and the like.

Hence, a VMM presents to other software ("guest software," "guests" or simply "guest") the abstraction of one or more VMs. The VMM can provide the same or different abstractions to the various guests. Each guest expects the full facilities of the hardware platform presented in the VM to be available for its use. For example, the guest expects to have access to all registers, caches, structures, I/O devices, memory and the like according to the architecture of the processor and platform presented in the VM. Further, each guest expects to handle various events, such as exceptions, interrupts and platform events (e.g., initialization) (INIT) and system management interrupts (SMIs).

Some of these resources and events are privileged because they are managed by the VMM to ensure proper operation of VMs and to protect the VMM and other VMs. For the privileged resources and events, the VMM facilitates functionality desired by guest software, while retaining ultimate control over these resources and events. The act of facilitating the functionality for the guest software may include a wide variety of activities on the part of the VMM. The activities of the VMM, as well as its characteristics, do not limit the scope of various embodiments described herein.

BRIEF DESCRIPTION OF THE DRAWINGS

The various embodiments of the present invention are illustrated by way of example, and not by way of limitation, in the figures of the accompanying drawings and in which.

DETAILED DESCRIPTION

In the following description, numerous specific details such as logic implementations, sizes and names of signals and buses, types and interrelationships of system components, and logic partitioning/integration choices are set forth to provide a more thorough understanding. It will be appreciated, however, by one skilled in the art that the invention may be practiced without such specific details. In other instances, control structures and gate level circuits have not been shown in detail to avoid obscuring the invention. Those of ordinary skill in the art, with the included descriptions, will be able to implement appropriate logic circuits without undue experimentation.

In the following description, certain terminology is used to describe features of the invention. For example, the term "logic" is representative of hardware and/or software configured to perform one or more functions. For instance, examples of "hardware" include, but are not limited or restricted to, an integrated circuit, a finite state machine or even combinatorial logic. The integrated circuit may take the form of a processor such as a microprocessor, application specific integrated circuit, a digital signal processor, a microcontroller, or the like.

Figure 1:
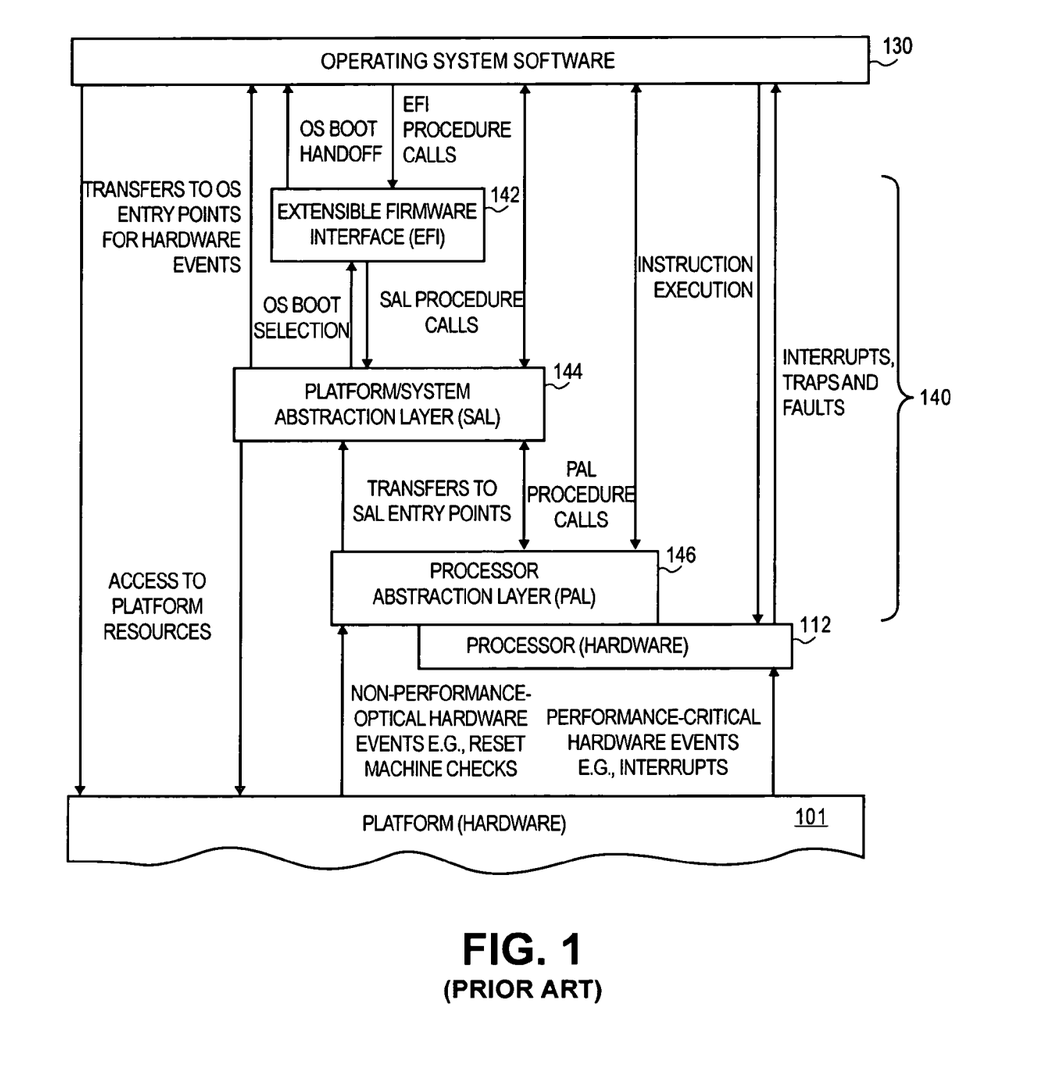
FIG. 1 is a block diagram illustrating a computer system including a firmware interface between operating system software and platform hardware, in accordance with one embodiment.

FIG. 1 is a block diagram illustrating a computer system including firmware 140 to provide an interface between operating system software 130 and platform hardware 101. As described herein, firmware refers to processor routines that are stored in non-volatile memory structures, such as read only memories (ROMs), flash memories, and the like. These memory structures preserve the code stored in them even when power is shut off. Even though firmware is stored in non-volatile memory, firmware may be copied or shadowed to volatile memory. Firmware traditionally provides the necessary instructions or routines that control a computer system when it is powered up from a shut down state, before volatile memory structures have been tested and configured. Firmware routines may also be used to reinitialize and reconfigure the computer system following various events and to handle certain platform events, such as system interrupts.

As shown in FIG. 1, firmware 140 includes three major components: extensible firmware interface (EFI) 142 to provide OS software 130 access to the firmware components. Representatively, the firmware components include system abstraction layer (SAL) 144 and processor abstraction layer (PAL) 146. As described herein, EFI 142, SAL 144 and PAL 146 are collectively referred to herein as "host firmware." In one embodiment, operating system software 130 interacts with host firm-ware, specifically PAL 144 and SAL 146 via EFI interface 142, to provide an environment in which applications can be executed by the CPU. SAL 144 is a firmware layer that isolates an operating system and other higher level software from implementation differences in the platform. PAL 146 provides a consistent software interface to access the processor resources across different processor implementations and encapsulates all processor model-specific hardware.

Figure 2:
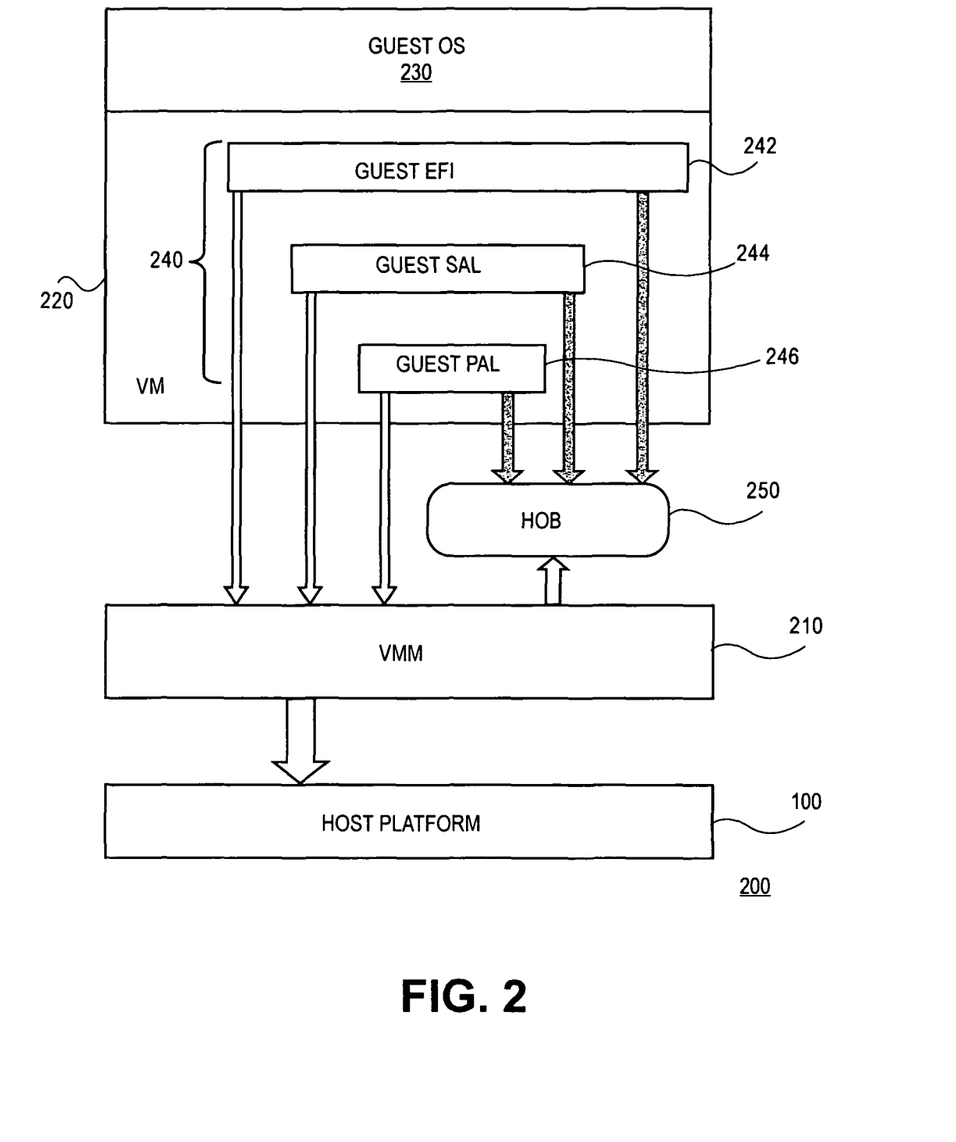
FIG. 2 is a block diagram illustrating cooperative guest firmware, in accordance with one embodiment.

As shown in FIG. 2, A virtual machine architecture logically partitions a physical machine, such that the underlying hardware of the machine is time-shared and appears as one or more independently operating virtual machines (VMs). A virtual machine monitor (VMM) creates the VM and runs on a computer to facilitate, for other software, the abstraction of one or more VMs. Each VM may function as a self-contained platform, running its own operating system (OS) and application software. The software running in a VM is collectively referred to herein as "guest software."

Referring again to FIG. 1, SAL 144 is a platform specific firmware component that may be provided, for example, by OEMs and system software vendors. SAL 144 is similar to a basic input/output system (BIOS). During boot-up of the computer system 100, SAL 144 interacts with the OS 130 (stored on a booted device, such as a hard disk drive, for example) to load portions of operating system 130 into memory (of the computer system). In the boot-up of the computer system 100, SAL 144 is responsible for performing platform tests, initialization and loading the first level of the operating system loader. As part of this process, VMM 210 is loaded and is responsible for creating and deploying VM 220 including cooperative guest firmware, in accordance with one embodiment.

In one embodiment, as shown in FIG. 2, in addition to loading guest OS within VM 220, VMM 210 also loads guest firmware 240 within VM 220. In one embodiment, guest firmware 240 includes EFI 242, SAL 244 and PAL 246, which are collectively referred to herein as "guest firmware." In a conventional environment, an OS needs to call various firmware services. Accordingly, in the embodiment illustrated in FIG. 2, guest firmware 240 is provided inside VM 220 to directly service all guest OS firmware needs. In one embodiment, cooperative guest firmware within VMM provides better processor and platform virtualization. As described herein, virtualization or virtualization policy refers to a decision as to which services are performed by guest firmware, which services are performed by the host firmware 140 and the host platform 101.

In one embodiment, to achieve cooperation between the guest firmware 240 and VMM 210, handoff block (HOB) data structure 250 is provided to convey the VMM virtualization strategy and VM configuration information to guest firmware 240. In one embodiment, when VMM 210 creates VM 220, VMM 210 defines processor and platform configuration information for VM 220. For example, the processor and platform configuration information may include, for example, the virtual processor abstraction (e.g., physical address bits supported and number of translation lookahead buffer (TLB) translation registers), the platform physical memory size, etc. In one embodiment, VMM 210 defines this processor and platform configuration information and creates HOB data structure 250 to provide the static information to guest firmware 240.

In one embodiment, following creation of HOB data structure 250 in memory, VMM 210 passes HOB data structure 250 to guest firmware 240 upon creation of VM 220. In one embodiment, guest firmware 240 digests the HOB information and operates accordingly. Representatively, HOB data structure 250 provides a static interface between guest firmware 240 and VMM 210. In one embodiment, in response to a firmware service request issued by guest OS 230, guest firmware 240 may query HOB data structure 250 to determine whether the request is for configuration information and provides such configuration information to guest OS 230 rather than having to trap to VMM 210 to access the processor and platform information.

Although HOB data structure 250 can provide static information, in some cases, this apparatus is unable to satisfy cooperation requirements between guest firmware 240 and VMM 210. For example, guest firmware 240 may need certain host software provided services (e.g., cache flush) because guest firmware 240 is running inside VM 220, guest firmware 240 cannot call the host, itself. However, the VMM 210, which is running at a highest privilege level is capable of initiating or servicing such requests. Accordingly, in one embodiment, a dynamic cooperation interface is provided between guest firmware 240 and VMM 210 to allow guest firmware 240 to dynamically initiate service requests to VMM 210.

In one embodiment, a handshake protocol for communication between guest firmware 240 and VMM 210 is provided using two possible synchronous mechanisms. Although two synchronous mechanisms are described, those skilled in the art should recognize that other techniques for communicating with VMM 210 and enabling VMM 210 to intercept services requests from guest firmware are possible while remaining within the scope of the described embodiments. In one embodiment, to dynamically initiate service requests to VMM 210, guest firmware 240 may initiate a break instruction, which provides a mechanism for the guest firmware 240 to trap into a break vector in host mode of the VMM.

In one embodiment, VMM 210 and guest firmware decide as part of the processor virtualization or initial platform configuration upon break intermediate values chosen from an architecturally reserved range. Accordingly, in response to detection of a break instruction, VMM 210 can check the break intermediate values to identify if the software break is a guest request for firmware runtime services. In an alternative embodiment, an instruction is provided that can change the processor virtualization mode between a guest and host mode without taking any interruption. Accordingly, in one embodiment, guest firmware 240 can use this instruction to implement mechanism to transition to host mode efficiently without VMM interception.

Representatively, the above-described features can be used to implement guest EFI 242, guest PAL 246 and guest SAL 244. For example, in one embodiment, PAL procedures to provide processor information; e.g., PAL_VM_SUMMARY or PAL_CACHE_INFO, guest PAL 246 can use the static cooperation method by retrieving processor information directly from HOB data structure 250 in response to requests issued by guest OS 230. Conversely, other PAL procedures that need VMM access to host PAL 146 during runtime (See, FIG. 1), such as, for example, PAL_HALT_LIGHT in which the VMM must wait until all virtual processors are within the same logical processor before putting the logical processor into a halt state.

Accordingly, in one embodiment, guest PAL 246, in response to such a host firmware runtime service request, requires initiation of the service request to host platform via VMM 210. As described herein, such procedures are referred to as "host firmware runtime services" which require VMM interception to initiate such requests. Accordingly, requests for host firmware runtime services may be detected by guest firmware 240 and communicated to VMM 210, which is responsible for servicing such request. Other various informational procedures, as well as non-informational procedures may be provided by guest SAL 244 and guest EFI 242, but are not described herein to avoid obscuring embodiments of the invention. However, those skilled in the art should recognize that such additional features may be provided by guest EFI 242, guest PAL 246 and guest SAL 244 while remaining within the scope of the embodiments described.

Figure 3:
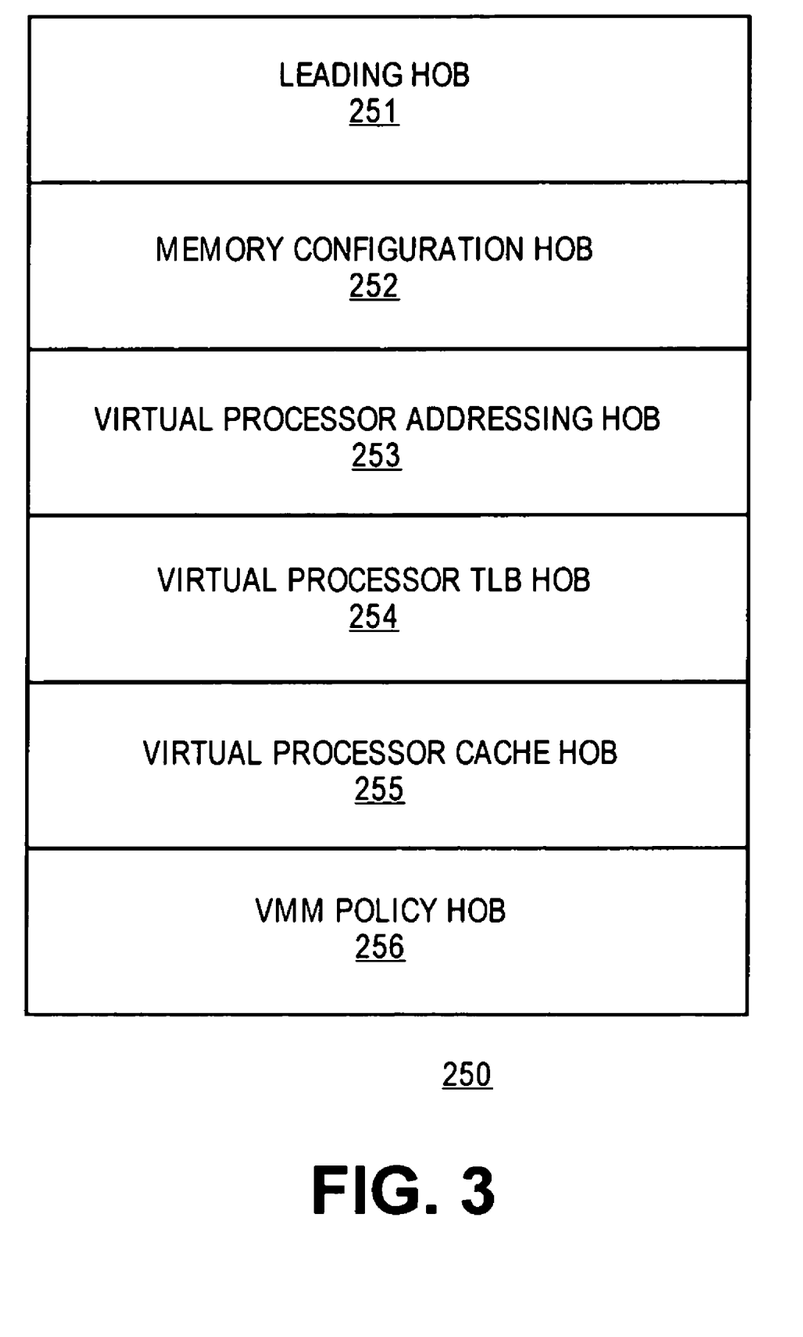
FIG. 3 is a block diagram illustrating a handoff block (HOB) data structure to enable cooperative guest firmware, as shown in FIG. 2, in accordance with one embodiment.

FIG. 3 illustrates HOB data structure 250, in accordance with one embodiment. In one embodiment, HOB data structure 250 is a software data structure used to store various VM configuration and virtualization policy information. In one embodiment, as shown in FIG. 3, the HOB structure 250 is a contiguous memory region with many contiguous HOB entries. In one embodiment, the leading HOB entry 251 specifies a length of the HOB structure 250. In one embodiment, all HOB entries have a type field, as well as a length field, to identify the HOB entry's length. In one embodiment, a 16-byte globally unique identifier (GUID) is used to uniquely identify each type.

In one embodiment, each HOB entry will have a data field, but the format inside the data field is HOB type specific. Representatively, HOB data structure 250 includes leading HOB 251 followed by memory configuration HOB 252. In one embodiment, memory configuration HOB provides the amount of physical memory that has been configured for the VM. HOB data structure 250 further includes virtual processor addressing HOB 253. In one embodiment, HOB entry 253 defines the maximum physical address line, virtual address line and other like virtual processor addressing. The next HOB entry 254 may include a virtual processor TLB HOB, which defines the maximum translation register number, region ID line, etc. A next entry 254 may define a processor or virtual processor cache HOB. As illustrated, a final HOB 256, a VMM policy HOB 256 will define the virtualization policy.

In one embodiment, the virtualization policy, as described herein, defines which guest firmware functions may be handled by the guest firmware and which functions shall fall to the host firmware as requested by VMM 210. Accordingly, as described, functions that may be performed by the guest firmware 240 will be described within HOB entry 226. Accordingly, upon receipt of HOB entry 226, the guest firmware 240 may be configured as indicated. Although described with the various HOB entries illustrated in FIG. 3, those skilled in the art should recognize that the various entries do not provide an exhaustive list of all possible entries within HOB 250 and may be added to or modified, as desired by the various configuration, while remaining within the scope of the described embodiments.

Figure 4:
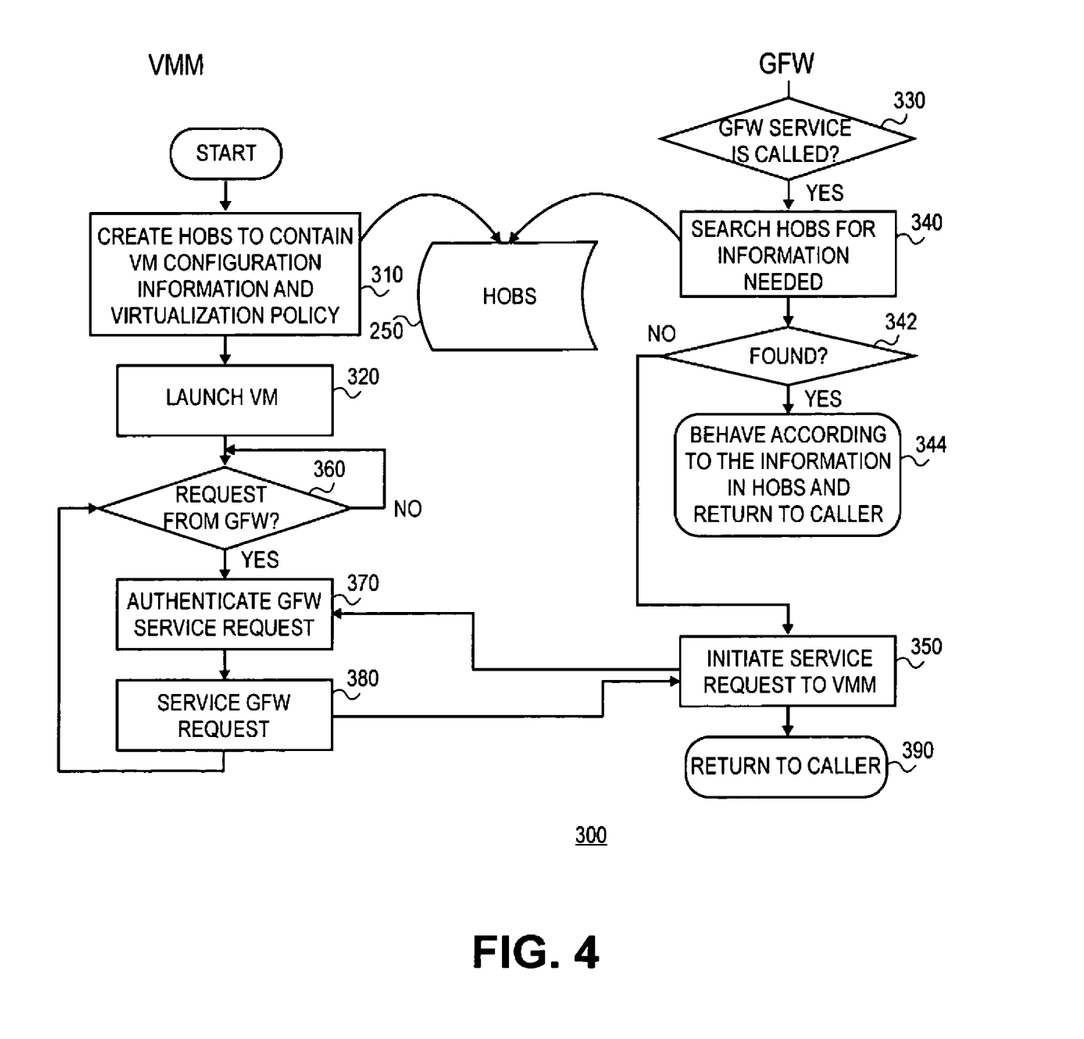
FIG. 4 is a flowchart illustrating a method for cooperative guest firmware, in accordance with one embodiment.

FIG. 4 is a flowchart illustrating a method 300 for providing cooperative guest firmware, in accordance with one embodiment. At process block 310, the VMM initially creates the HOB data structure to contain the VM configuration information and a virtualization policy. Following such creation, at process block 320, the VMM will launch the VM to include at least guest firmware, as well as the guest OS. Once launched, the guest firmware will determine whether a guest firmware service is called by the guest OS. In response to such a service request, the guest firmware will search the HOBs for requested information.

Accordingly, if static information regarding the processor and platform configuration information is requested by the guest operating system, at process block 342, such information is found within the HOB and at process block 344, the guest firmware behaves according to the information in the HOB and returns control to the caller. However, if the request is a request for host firmware runtime services, at process block 350, the guest firmware initiate a service request to VMM. At process block 360, the VMM determines whether a request is received from the guest firmware. Once received, the VMM authenticates the guest firmware service request to verify that the service request is authentic. Once authenticated, at process block 380, the VMM services the guest firmware request.

Figure 5:
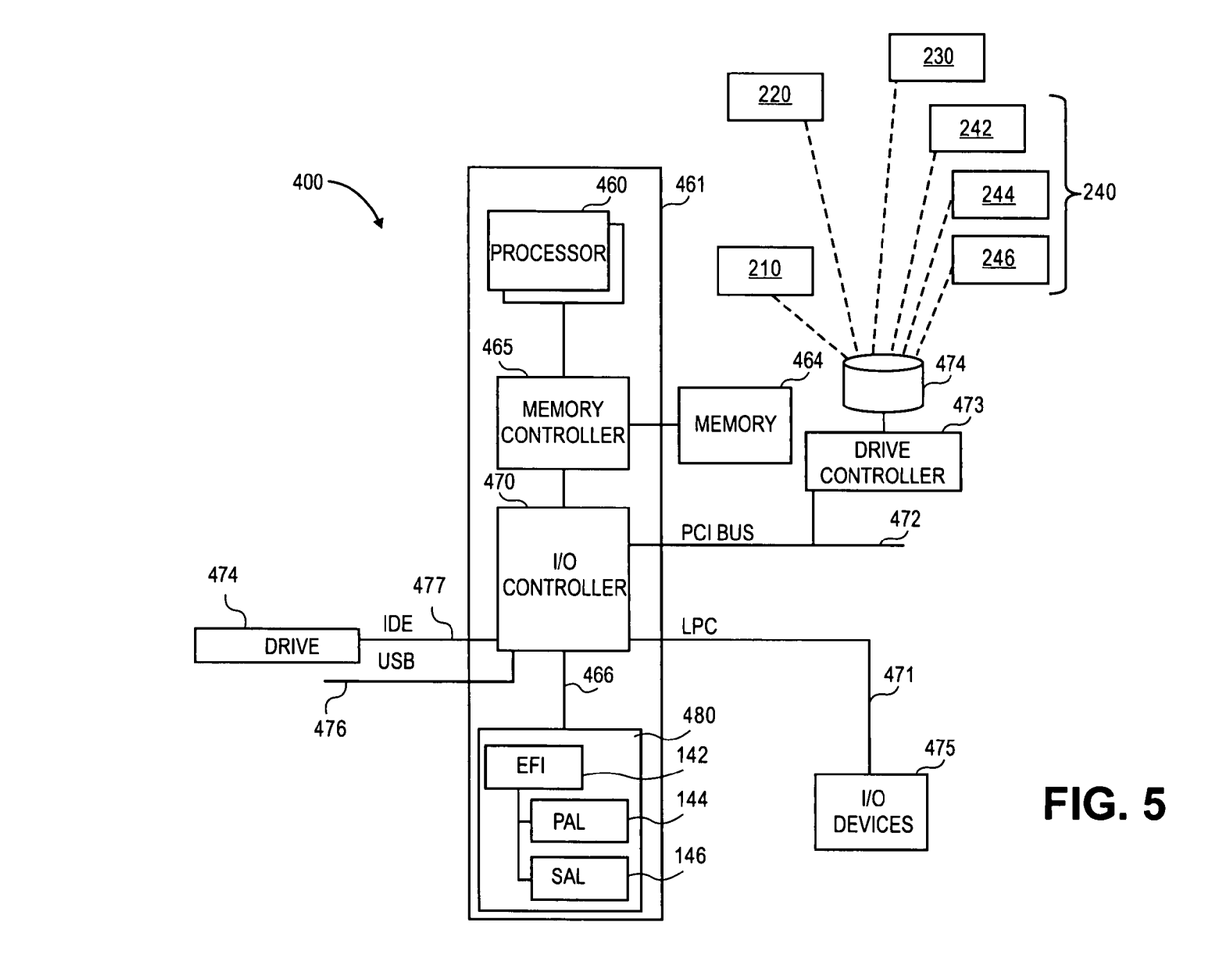
FIG. 5 is a block diagram illustrating a system to provide cooperative guest firmware, in accordance with one embodiment.

FIG. 5 is a block diagram illustrating a computer system 400 in which the cooperative guest firmware, as described in the embodiments herein, may be implemented. Initially, the guest firmware 240, the guest OS 230, the VMM 210 and other like components are stored within the hard disk or disk memory 474, as shown in the computer system 400 of FIG. 5. Likewise, the host firmware, including EFI 142, PAL 146 and SAL 144, are initially stored in non-volatile memory 480. Accordingly, the guest firmware 240 is initially stored on hard disk 474. In operation, the VMM 210 will load the guest firmware 240 from the hard disk 474 and copy the guest firmware 240 into a well-defined location, such as a predetermined VMM block of memory.

In one embodiment, a region of memory is reserved for the guest firmware. In one embodiment, the reserved range may be a 16 megabyte (MB) region to contain the guest firmware image and other configuration data. Representatively, the VMM 210 will prepare VM configuration in an HOB data format to include the physical memory size, address space, PAL information, SAL information, EFI information and the like and place the VM configuration in the VM block. The VMM will then copy the guest firmware image from the host hard disk into the defined area in the VMM block. In one embodiment, the firmware will provide a mapping of the guest firmware image and various components into a predetermined guest physical address space.

Representatively, computer system 400 may be, for example, a personal computer system. Computer system 400 may include one or more processors (e.g., processor 460), a memory controller 465, an input/output (I/O) controller 470, and one or more BIOS memories (e.g., BIOS memory 480). In one embodiment, processor 460, memory controller 465, I/O controller 470 and BIOS memory 480 may reside on a motherboard 461. In an alternative embodiment, one or more of processor 460, memory controller 465, I/O controller 470 and BIOS memory 480 may reside on other types of component boards, for example, a daughter board.

The memory controller 465 controls operations between processor 460 and a memory device 464, for example, computer-readable storage medium, such as a random access memory (RAM). The I/O controller 470 may control operations between processor 460 and one or more input/output (I/O) devices 475, for examples, a keyboard and a mouse over a low pin count (LPC) bus 471. The I/O controller 470 may also control operations between processor 460 and peripheral devices, for example, a drive 474 coupled to I/O controller via an integrated drive electronics (IDE) interface 477. Additional buses may also be coupled to I/O controller 470 for controlling other devices, for examples, a peripheral component interconnect (PCI) bus 472, or follow on bus (e.g., PCIx, PCI Express) and a universal serial bus (USB) 476. In one embodiment, the memory controller 465 and the I/O controller 470 may be integrated into a single component.

In the embodiment illustrated, a driver controller 473 may be coupled to PCI bus 472 and may control operations of hard disk drive 474. In one embodiment, guest firmware 240, including guest EFI 242, guest SAL 244, guest PAL 246, guest OS 230 and VMM 210, may be stored on the hard disk drive 474. In this manner, the hard disk drive may serve as the boot-up device including, for example, a loader program to load the various host components as well as the VMM 210 to load the VM as well as the various guest components, including guest firmware and a guest OS within the VMM.

BIOS memory 480 may be coupled to I/O controller 470 via bus 466. BIOS memory 480 is a non-volatile programmable memory, for example, a flash memory that retains the contents of data stored within it even after power is no longer supplied. Alternatively, BIOS memory 480 may be other types of programmable memory devices, for examples, a programmable read only memory (PROM) and an erasable programmable read only memory (EPROM) or other like computer-readable storage mediums. Computer system 400 may also include other BIOS memories in addition to BIOS memory 480.

Accordingly, as shown in FIG. 5, BIOS memory 480 may include host platform firmware for initializing the computer system following system reset. As described herein, the host firmware includes EFI 142, SAL 144 and PAL 146. Accordingly, as described herein the guest firmware 240 is loaded during boot-up of computer system 400 to provide a host platform. Following the boot-up, the host platform will load a VMM, which is responsible for loading the guest firmware 240, guest software and other like components from hard disk 474.

ALTERNATE EMBODIMENTS

It will be appreciated that, for other embodiments, a different system configuration may be used. For example, while the system 400 includes a single CPU 460, for other embodiments, a multiprocessor system (where one or more processors may be similar in configuration and operation to the CPU 460 described above) may benefit from the cooperative guest firmware of various embodiments. Further different type of system or different type of computer system such as, for example, a server, a workstation, a desktop computer system, a gaming system, an embedded computer system, a blade server, etc., may be used for other embodiments.

Having disclosed embodiments and the best mode, modifications and variations may be made to the disclosed embodiments while remaining within the scope of the embodiments as defined by the following claims.

What is claimed is:

1. A method comprising:
   launching a virtual machine (VM), on a host platform computer, using a virtual machine monitor (VMM) running on the host platform computer, the VM to have at least a guest operating system (OS) and a guest firmware;
   providing a static interface and a dynamic interface for a communication between the guest firmware and the VMM, the static interface to provide information including configuration information of the host platform computer to the guest firmware, the dynamic interface to allow the guest firmware to dynamically issue service requests to the VMM to access host platform computer services;
   generating a data structure, upon launching the VM, in a memory associated with the guest firmware, the data structure to act as the static interface to provide the configuration information, including processor and platform configuration information, to the guest firmware, by:
   defining the processor and platform configuration information for the VM;
   defining a virtualization policy for the VM;
   creating the data structure in the memory according to the virtualization policy, and the processor and platform configuration information; and
   passing the data structure to the guest firmware upon creation of the VM by passing a memory reference to the guest firmware within the VM to enable the guest firmware to access the configuration information and the virtualization policy within the data structure;
   receiving a request from the guest firmware for the host platform computer services via the dynamic interface; and
   in response to receiving the request for the host platform computer services, the VMM:
   changing a processor virtualization mode from a guest mode to a host mode without interruption of the VMM, the host mode providing an access to the host platform computer services;
   requesting, in the host mode, the host platform computer services from the host platform computer; and
   servicing the request from the guest firmware for the host platform computer services.

2. The method of claim 1, wherein servicing the guest firmware requests further comprises:
   receiving the guest firmware requests from one of a guest extensible firmware interface (EFI) firmware module, a guest processor abstraction layer (PAL) firmware module and a guest system abstraction layer (SAL) firmware module in the guest firmware; and
   requesting a host firmware runtime service from one of a host EFI firmware module, a host PAL firmware module and a host SAL firmware module in a host firmware.

3. An article of manufacture having a non-transitory computer-readable storage medium including associated instructions, wherein the instructions, when executed, on a machine comprising at least one component performing:
   generating a data structure in memory including configuration information of a virtual machine (VM) and a virtualization policy, by:
   defining the processor and platform configuration information for the VM;
   defining a virtualization policy for the VM;
   creating the data structure in the memory according to the virtualization policy, and the processor and platform configuration information; and
   passing the data structure to the guest firmware upon creation of the VM;
   passing a memory reference to a guest firmware within the VM to enable the guest firmware to access the configuration information and the virtualization policy within the data structure;
   launching the VM, on a host platform computer, using a virtual machine monitor (VMM) running on the host platform computer, the VM to have at least a guest operating system (OS) and the guest firmware;
   providing a static interface and a dynamic interface for a communication between the guest firmware and the VMM, wherein the data structure acts as the static interface to provide information including configuration information of the host platform computer to the guest firmware, the dynamic interface to allow the guest firmware to dynamically issue service requests to the VMM to access host platform computer services;
   receiving a request from the guest firmware for the host platform computer services via the dynamic interface; and
   in response to receiving the request for the host platform computer services,
   changing a processor virtualization mode from a guest mode to a host mode without interruption of the VMM, the host mode providing an access to the host platform computer services, requesting, in the host mode, the host platform computer services from the host platform computer, and servicing the request from the guest firmware for the host platform computer services.

4. The article of manufacture of claim 3, wherein servicing the request further comprises:

receiving the request from one of a guest extensible firmware interface (EFI) firmware module, a guest processor abstraction layer (PAL) firmware module and a guest system abstraction layer (SAL) firmware module in the guest firmware; and requesting a host firmware runtime service from one of a host EFI firmware module, a host PAL firmware module and a host SAL firmware module in a host firmware.

5. The article of manufacture of claim 3, wherein servicing the request further comprises:

detecting the request received from the guest firmware;

authenticating the request as a guest firmware service request; and servicing the request for host firmware runtime services.

6. A system comprising:

a host platform computer;

a virtual machine monitor (VMM) running on the host platform computer;

a virtual machine (VM) launched on the host platform computer by the VMM, the VM having at least a guest operating system (OS) and a guest firmware, wherein the guest firmware communicating with the VMM via a static interface, a dynamic interface or a combination of both;

the static interface to provide information including configuration information of the host platform computer to the guest firmware;

the dynamic interface to allow the guest firmware to dynamically issue service requests to the VMM to access host platform computer services;

the guest firmware to search a data structure received from the VMM according to a guest firmware service request received from the guest OS for configuration information and to initiate a service request, via the dynamic interface, to the VMM if the guest firmware service request is for a host firmware runtime service;

the data structure generated in a memory associated with the guest firmware, wherein the data structure acts as the static interface to provide the configuration information, including processor and platform configuration information, to the guest firmware by:

defining the processor and platform configuration information for the VM;

defining a virtualization policy for the VM;

creating the data structure in the memory according to the virtualization policy, and the processor and platform configuration information; and passing the data structure to the guest firmware upon creation of the VM by passing a memory reference to the guest firmware within the VM to enable the guest firmware to access the configuration information and the virtualization policy within the data structure;

wherein the guest firmware is to issue an instruction to change a processor instruction state from a guest mode to a host mode to request, in the host mode, the host firmware runtime service from the host platform computer, the host mode providing an access to the host firmware runtime service.

7. The system of claim 6, wherein the VMM is to generate the data structure in memory associated with the guest firmware to provide a virtualization policy, processor and platform information to the guest firmware, and wherein the guest firmware is to use the data structure to respond to requests received from the guest OS for static configuration information and to service the guest firmware service request for the host firmware service.

8. The system of claim 6, wherein the guest firmware is to issue a break instruction to the VMM, the break instruction including a value to indicate the guest firmware service request for the host firmware runtime service.

9. The system of claim 6, wherein the guest firmware is further to analyze the virtualization policy to identify guest firmware functions to be performed by the guest firmware, and to analyze the virtualization policy to identify host firmware functions to be performed by host firmware.

* * * * *